(12) United States Patent
Honda et al.

(10) Patent No.: US 7,113,249 B2
(45) Date of Patent: Sep. 26, 2006

(54) MONOCHROME LIQUID CRYSTAL DISPLAY HAVING HIGHER SPACES IN PIXEL AREA THAN IN PERIPHERAL AREA AND PRODUCTION METHOD THEREFOR

(75) Inventors: Tomohisa Honda, Tokyo-to (JP); Tomonobu Sumino, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 10/748,434

(22) Filed: Dec. 30, 2003

(65) Prior Publication Data
US 2004/0150782 A1 Aug. 5, 2004

(30) Foreign Application Priority Data
Jan. 6, 2003 (JP) ............................. 2003-000726
Jan. 6, 2003 (JP) ............................. 2003-000728

(51) Int. Cl.
*G02F 1/1339* (2006.01)
(52) U.S. Cl. ...................... 349/157; 349/155; 349/156; 349/160
(58) Field of Classification Search ........ 349/155–158, 349/160
See application file for complete search history.

(56) References Cited
U.S. PATENT DOCUMENTS
5,659,379 A * 8/1997 Morimoto ................... 349/149

| 6,281,952 | B1 * | 8/2001 | Okamoto et al. | ............. 349/12 |
| 6,819,391 | B1 * | 11/2004 | Kim et al. | .................. 349/157 |
| 2003/0025868 | A1 * | 2/2003 | Hiroshima et al. | ......... 349/156 |
| 2003/0112405 | A1 * | 6/2003 | Kim et al. | .................. 349/156 |

* cited by examiner

*Primary Examiner*—Andrew Schechter
(74) *Attorney, Agent, or Firm*—Ladas & Parry LLP

(57) ABSTRACT

The main object of the present invention is to provide a substrate for a monochrome liquid crystal display apparatus having the excellent evenness of the gap between the substrate for a monochrome liquid crystal display apparatus and the counter substrate, capable of displaying with a preferable image quality without the brightness irregularity.

In order to achieve the above-mentioned object, the present invention provides a substrate for a monochrome liquid crystal display apparatus comprising a substrate, a black matrix formed in a pattern on the substrate, a protection layer formed on the substrate so as to cover the black matrix, and a columnar spacer formed in the area with the black matrix formed of the protection layer, for adjusting the gap between the substrate and the counter substrate, wherein the height from the surface of the substrate to the upper surface of the columnar spacer provided in the pixel part of the substrate is higher than the height from the substrate surface to the upper surface of the columnar spacer provided in the outer peripheral part as the pixel part peripheral area of the substrate by in a range of 0 μm to 0.8 μm.

6 Claims, 3 Drawing Sheets

MONOCHROME LIQUID CRYSTAL DISPLAY HAVING HIGHER SPACES IN PIXEL AREA THAN IN PERIPHERAL AREA AND PRODUCTION METHOD THEREFOR

BACKGROUND OF THE INVENTION

1. Field of the Invention

The present invention relates to a substrate for a monochrome liquid crystal display apparatus used for a monochrome liquid crystal display apparatus. More specifically, it relates to a substrate for a monochrome liquid crystal display apparatus capable of preventing deterioration of the display characteristics, and a production method therefor.

2. Description of the Related Art

Conventionally, a liquid crystal display apparatus has been used as the information displaying means in many fields, regardless of the monochrome type and the color type.

For example, the monochrome liquid crystal display apparatus has a structure comprising at least a substrate for a monochrome liquid crystal display apparatus having a substrate, a black matrix formed in a pattern on the substrate, and a protection layer provided for protecting the black matrix and ensuring the flatness of the substrate surface, a counter substrate facing the substrate for a monochrome liquid crystal display apparatus, and a liquid crystal layer clamped between the substrate for a monochrome liquid crystal display apparatus and the counter substrate.

Recently, as the gapping material (spacer) for constantly maintaining the gap between the substrate for a liquid crystal display apparatus and the counter substrate, a columnar spacer is used instead of the plastic beads, which have been used conventionally. That is, in order to solve the problems of the contrast deterioration derived from the light leakage in the vicinity of the plastic beads and the display irregularity derived from the distribution irregularity, a columnar spacer is formed on the side of either substrate, and the gap between the two substrates is maintained constantly by the spacer.

For example, Japanese Patent Application Laid Open (JP-A) No. 11-109366 discloses a technique using a columnar spacer comprising a large diameter spacer comprising one layer and a small diameter spacer comprising two or more layers for preventing generation of the irregularity in terms of the height of the columnar spacer itself in the liquid crystal display apparatus display area and the outside of the display area. Furthermore, JP-A No. 2002-148426 discloses a technique for constantly maintaining the shape of the columnar spacer according to the two layer structure of a columnar spacer comprising a low deformation part with a small deformation amount in the high temperature and high pressure, and a high elasticity part capable of following the contraction of the liquid crystal at a low temperature for preventing the change of the columnar spacer by the influence of the high temperature and high pressure at the time of assembling the liquid crystal display apparatus. Moreover, JP-A No. 11-2717 discloses a technique for constantly maintaining the gap between the two substrates by projecting a columnar spacer from a predetermined position in a range of 1 to 4 µm.

According to an example of the conventional substrate for a monochrome liquid crystal display using the columnar spacer, as shown in FIG. 3, a black matrix 2 is formed in a pattern across the pixels on the substrate 1 for a monochrome liquid crystal display apparatus. The black matrix 2 is formed with the width narrower in a part corresponding to the pixel parts A as the display area in order not to lower the aperture ratio of the display area. In contrast, the black matrix 2 formed in the outer peripheral part B outside the display area is formed with the width wider in order to effectively block the light from the light source such as a back light.

Furthermore, a protection layer 3 is formed for covering the surface of the black matrix 2 for protecting the members such as the black matrix 2, and for providing the flatness to the surface of the substrate 1 for a monochrome liquid crystal display apparatus. According to the protection layer 3, the film thickness difference is generated between the pixel part A and the outer peripheral part B. This is because the protection layer 3 can hardly be laminated on the upper surface of the black matrix 2 disposed on the pixel part A with the width formed narrower so that the film thickness of the laminated protection layer 3 tends to be thinner. In contrast, since the black matrix 2 provided in the outer peripheral part B is formed with a sufficient width, the film thickness of the protection layer 3 is made thicker than that of the pixel part A. In the case the columnar spacer 4 is formed on the protection layer 3, due to the above-mentioned film thickness difference of the protection layer 3 itself, as to the height from the surface of the substrate 1 for a monochrome liquid crystal display apparatus to the upper surface of the columnar spacer 4, it is higher in the outer peripheral part B than in the pixel part A.

The height difference appears as the gap difference between the substrates so that the difference in the gap area significantly influences the display characteristics particularly in the IPS type monochrome liquid crystal display apparatus. Moreover, in the case the counter substrate 5 is disposed on the substrate for a monochrome liquid crystal display layer via the columnar spacer 4, distortion is generated in the counter substrate 5. The distortion generates the trouble of the light leakage from the counter substrate 5 peripheral part so that the problem of the brightness in the periphery of the screen is generated.

In order to solve the problems in the conventional substrate for a monochrome liquid crystal display apparatus, although a method of forming columnar spacers individually on the pixel part and on the outer peripheral part at the time of forming the columnar spacers is considered, it has been difficult to precisely adjusting the height due to the influence at the time of forming the columnar spacers in some cases.

SUMMARY OF THE INVENTION

In view of the above-mentioned problems, the main object of the present invention is to provide a substrate for a monochrome liquid crystal display apparatus having the excellent evenness of the gap between the substrate for a monochrome liquid crystal display apparatus and the counter substrate, capable of displaying with a preferable image quality without the brightness irregularity.

In order to achieve the above-mentioned object, a first aspect of the present invention provides a substrate for a monochrome liquid crystal display apparatus comprising a substrate, a black matrix formed in a pattern on the substrate, a protection layer formed on the substrate so as to cover the black matrix, and a columnar spacer formed in the area with the black matrix formed of the protection layer, for adjusting the gap between the substrate and the counter substrate, wherein the height from the surface of the substrate to the upper surface of the columnar spacer provided in the pixel part of the substrate is higher than the height from the substrate surface to the upper surface of the columnar spacer provided in the outer peripheral part as the pixel part peripheral area of the substrate by in a range of 0 µm to 0.8 µm.

According to the present invention, since the difference of the distance from the substrate surface to the columnar spacer upper surface disposed in the pixel part and the distance from the substrate surface to the columnar spacer upper surface disposed in the outer peripheral part is in the above-mentioned range, in the case the counter substrate is disposed on the substrate for a monochrome liquid crystal display apparatus, generation of the distortion in the counter substrate with the gap widened toward the outer peripheral part can be restrained. Therefore, the trouble of the light leakage from the periphery of the counter substrate, generated due to the distortion of the counter substrate can be solved so that the problem of the unnatural brightness in the periphery of the screen in the monochrome liquid crystal display apparatus can be solved.

Moreover, a second aspect of the present invention provides a substrate for a monochrome liquid crystal display apparatus comprising a substrate, a black matrix formed in a pattern on the substrate, a protection layer formed on the substrate so as to cover the black matrix, and a columnar spacer formed in the area with the black matrix formed of the protection layer, for adjusting the gap between the substrate and the counter substrate, wherein the columnar spacer comprises a pixel spacer provided in the pixel part of the substrate, and an outer peripheral spacer provided in the outer peripheral part as the pixel part peripheral area of the substrate such that the height of the pixel spacer is made higher than the height of the outer peripheral spacer.

According to the present invention, since the columnar spacer is divided into the pixel spacer and the outer peripheral spacer with the height of the pixel spacer made higher than the height of the outer peripheral spacer, the gap difference between the substrates derived from the film thickness difference of the protection layer can be preferably corrected. Therefore, since the counter substrate can be disposed on the substrate for a liquid crystal display apparatus without distortion, an even gap can be maintained between the both substrates so that a high image quality display can be enabled.

In the above-mentioned first aspect, it is preferable that the columnar spacer comprises a pixel spacer provided in the pixel part of the substrate, and an outer peripheral spacer provided in the outer peripheral part of the substrate such that the height of the pixel spacer is made higher than the height of the outer peripheral spacer. By accordingly adjusting the heights of the columnar spacers, the total height of the substrate for a monochrome liquid crystal display apparatus can be provided in the above-mentioned range so that the gap between the two substrates can be maintained precisely and constantly without generating the distortion in the counter substrate.

In the above-mentioned invention, it is preferable that the substrate for a monochrome liquid crystal display apparatus is used for an IPS type monochrome liquid crystal display apparatus. Since the IPS type is the liquid crystal display apparatus particularly requiring the gap evenness between the substrate and the counter substrate, the effect of the substrate for a monochrome liquid crystal display apparatus can be utilized sufficiently.

Moreover, the present invention provides a production method for a substrate for a monochrome liquid crystal display apparatus comprising:

forming a black matrix in a pattern on a substrate, forming a protection layer on the substrate having the black matrix formed in the pattern so as to cover the black matrix, and forming a columnar spacer for adjusting the gap between the substrate and the counter substrate in the area with the black matrix formed of the protection layer first in the outer peripheral part in the periphery of the pixel part as the display area of the monochrome liquid crystal display apparatus, and then forming the same in the pixel part.

According to the present invention, since the columnar spacer is formed first in the outer peripheral part and then the columnar spacer is formed in the pixel part, the influence at the time of forming the columnar spacer is not posed to the columnar spacer disposed in the pixel part so that the demand can be achieved sufficiently for the columnar spacer in the pixel part with the particularly precise height adjustment demanded. Moreover, since the factor for disturbing wetting and spreading of the coating liquid for forming the columnar spacer, such as the columnar spacer disposed in the pixel part, or the like is not on the substrate at the time of forming the columnar spacer in the outer peripheral part, there is no risk of generating the film thickness irregularity, or the like. Moreover, since the columnar spacers are formed individually in the pixel part and the outer peripheral part, each columnar spacer can be formed easily to the height required for each part according to the film thickness difference in the pixel part and the outer peripheral part of the protection layer on the black matrix. Therefore, according to the substrate for a monochrome liquid crystal display apparatus produced by the production method, since the preferable height evenness can be obtained in the upper end face of the columnar spacer, the counter substrate disposed on the substrate for a monochrome liquid crystal display apparatus via the columnar spacer is not distorted so as to widen the gap between the two substrates toward the outer peripheral part so that the trouble of the light leakage form the periphery of the counter substrate can hardly be generated. Thereby, the problem of the brightness in the peripheral part of the display screen can be solved.

Moreover, at the time, it is preferable that the above-mentioned substrate for a monochrome liquid crystal display apparatus is used for the IPS type monochrome liquid crystal display apparatus. Since the IPS type is the liquid crystal display apparatus particularly requiring the gap evenness between the substrate and the counter substrate, the effect of the production method for a substrate for a monochrome liquid crystal display apparatus can be utilized sufficiently.

DESCRIPTION OF THE PREFERRED EMBODIMENT

The present invention relates to a substrate for a monochrome liquid crystal display apparatus, and a production method therefor. Hereinafter, each will be explained independently.

A. Substrate for a Monochrome Liquid Crystal Display Apparatus

Hereinafter, a substrate for a monochrome liquid crystal display apparatus of the present invention will be explained.

A substrate for a monochrome liquid crystal display apparatus according to the present invention comprises a substrate, a black matrix formed in a pattern on the substrate, a protection layer formed on the substrate so as to cover the black matrix, and a columnar spacer formed in the area with the black matrix formed of the protection layer, for adjusting the gap between the substrate and the counter substrate, wherein the height from the surface of the substrate to the upper surface of the columnar spacer provided in the pixel part of the substrate is higher than the height from the substrate surface to the upper surface of the columnar spacer provided in the outer peripheral part as the pixel part peripheral area of the substrate by in a predetermined range.

According to the substrate for a monochrome liquid crystal display apparatus of the present invention, the height from the substrate surface of the substrate for a monochrome liquid crystal display apparatus and the columnar spacer upper surface provided in the pixel part of the substrate needs to be higher than the height from the same substrate surface to the columnar spacer upper surface provided in the outer peripheral part as the pixel part periphery area of the substrate by in a range of 0 µm to 0.8 µm, in particularly preferable that it is higher by in a range of 0.2 µm to 0.6 µm. According to the configuration, at the time of disposing the counter substrate on the substrate for a monochrome liquid crystal display apparatus, the counter substrate cannot be distorted so as to widen the gap toward the outer peripheral part, and thereby the display quality of the monochrome liquid crystal display apparatus to be finally obtained can be improved dramatically. Moreover, at the time of injecting a liquid crystal between the two substrates for forming a liquid crystal layer, the liquid crystal can be injected efficiently.

Figure 1:
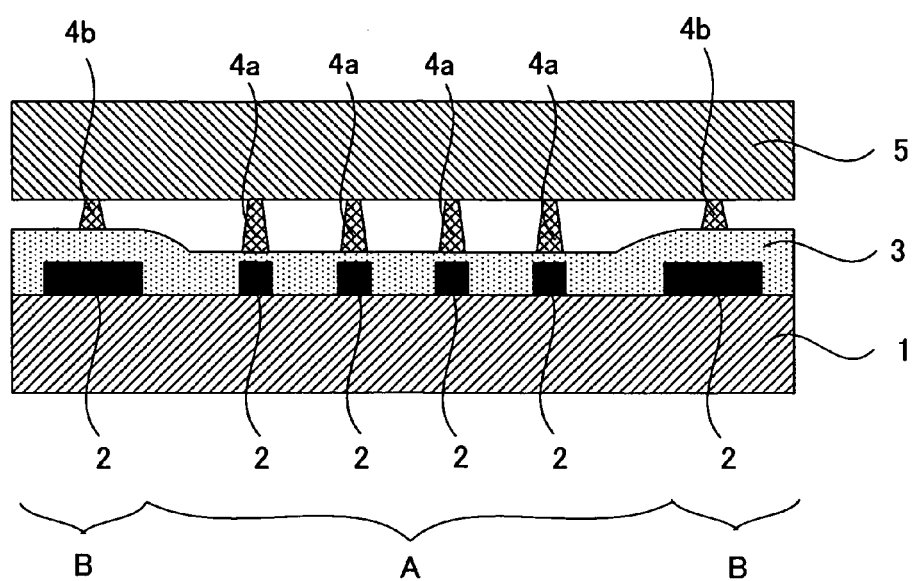
FIG. 1 is a schematic cross-sectional view showing an example of a substrate for a monochrome liquid crystal display apparatus according to the present invention.

Hereinafter, the substrate for a monochrome liquid crystal display apparatus of the present invention will be explained with reference to the drawings. FIG. 1 is a schematic cross-sectional view showing an example of a substrate for a monochrome liquid crystal display apparatus of the present invention.

As shown in FIG. 1, a black matrix 2 for sectioning between the pixels is formed in a pattern on a substrate 1 of the substrate for a monochrome liquid crystal display apparatus. The black matrix 2 is provided such that the width differ in the pixel part A as the display area of the monochrome liquid crystal display apparatus and in the outer peripheral part B as the area outside the display part. Specifically, in the pixel part A, the width is formed narrower so as to prevent deterioration of the aperture ratio of the display area. In contrast, in the outer peripheral part B, the width is formed wider so as to block the light beam from the light source. A protection layer 3 is formed on the substrate 1 for a monochrome liquid crystal display apparatus with the black matrix 2 formed so as to cover the black matrix 2 surface for protecting the members such as the black matrix 2, and for providing the flatness to the substrate 1 surface. According to the protection layer 3, the film thickness differs in the protection layer 3 with the width difference of the black matrix in the pixel part A and in the outer peripheral part B provided as the factor. That is, since the width of the black matrix 2 is narrow in the pixel part A, the film thickness of the protection layer 3 to be laminated on the black matrix 2 upper surface tends to be thinner. In contrast, since the black matrix 2 is formed with a sufficient width for laminating the protection layer 3 in the outer peripheral part B, the film thickness of the protection layer 3 to be laminated on the upper surface thereof becomes thicker than that of the protection layer 3 in the pixel part A.

Columnar spacers 4a, 4b are provided in the area with the black matrix 2 formed of the protection layer 3. With the premise that the columnar spacer provided in the pixel part A is the pixel spacer 4a, and the columnar spacer provided in the outer peripheral part B is the outer peripheral spacer 4b, by providing the columnar spacers 4a, 4b such that the height of the pixel spacer 4a itself is higher than the height of the outer peripheral spacer 4b itself according to the film thickness difference of the protection layer 3, the influence by the film thickness difference of the protection layer 3 can be avoided in the final substrate for a monochrome liquid crystal display apparatus.

A counter substrate 5 is disposed so as to face the substrate 1 for a monochrome liquid crystal display apparatus via the columnar spacers 4a, 4b. According to the present invention, since the height of the substrate for a monochrome liquid crystal display apparatus is precisely adjusted, the troublesome distortion is not generated in the counter substrate 5, or the like. Thereby, since the light beam from the light source cannot be leaked from the periphery of the counter substrate 5, or the like, the problem of the unnatural brightness in the periphery of the display screen can be solved.

The "pixel part" here denotes the part to be the display area for actually displaying a monochrome image at the time a monochrome liquid crystal display apparatus is provided using the substrate for a monochrome liquid crystal display apparatus of the present invention. Furthermore, the "outer peripheral part" denotes the part disposed in the periphery of the pixel part, corresponding to the area outside the above-mentioned display area.

Hereinafter, the members comprising the substrate for a monochrome liquid crystal display apparatus of the present invention, having these advantages will be explained.

(1) Columnar Spacer

The columnar spacer in the present invention is disposed between two substrates for clamping a liquid crystal layer in the inside for constantly maintaining the gap between the two substrates. Moreover, according to the present invention, it is one of the major characteristics that two columnar spacers having different heights in the pixel part and in the outer peripheral part.

According to the columnar spacer, with the premise that the columnar spacer disposed in the pixel part corresponding to the display area of the monochrome liquid crystal display apparatus is the pixel spacer, and the columnar spacer disposed in the outer peripheral part corresponding to the area outside the display area is the outer peripheral spacer, the relationship between the heights of the pixel spacer and the outer peripheral spacer is not particularly limited as long as the height of the pixel spacer is made higher than the height of the outer peripheral spacer to the degree that the above-mentioned distortion is not generated between the two substrates at the time they are disposed. This is because the protection layer film thickness is formed thinner in the pixel part than in the outer peripheral part due to the width difference of the black matrix in the pixel part and in the outer peripheral part. By making the height of the pixel spacer higher than the height of the outer peripheral spacer, the protection layer film thickness difference can be corrected by the columnar spacers.

Specifically, the height difference between the pixel spacer and the outer peripheral spacer can be adjusted according to the film thickness difference of the protection layer in the pixel part and in the outer peripheral part formed on the black matrix. For example, by measuring, simulating, or the like the film thickness difference of the protection layer at the stage the protection layer is formed for preliminarily grasping the state of the substrate for a monochrome liquid crystal display apparatus, the height difference of the pixel spacer and the outer peripheral spacer is adjusted according to the state. Therefore, although it is difficult to define the height difference of the pixel spacer and the outer peripheral spacer on the whole, based on the film thickness difference of the protection layer to be generally generated, it is preferable that the height of the pixel spacer is made higher than the height of the outer peripheral spacer itself by in a range of 0 µm to 1.3 µm, and in particular, in a range of 0.5 µm to 1.1 µm. This is because the height from the substrate surface of the substrate for a monochrome liquid crystal display apparatus to the upper surface of the columnar spacer provided in the pixel part of the substrate can be made higher in the above-mentioned range than the height from the same substrate surface to the upper surface of the columnar spacer provided in the outer peripheral part of the substrate as mentioned above, and thus the two substrates can be disposed with the highly even gap maintained without generating a troublesome distortion in the counter substrate.

Moreover, the height of the pixel spacer itself is not particularly limited as long as it is a height used in a common monochrome liquid crystal display apparatus. Specifically, it is preferably in a range of 2.5 µm to 5.5 µm.

As to the method for forming the columnar spacer, it is not particularly limited as long as it is a method capable of forming the same precisely in a pattern on the protection layer area with the black matrix formed. Specifically, the photolithography method, or the like can be presented.

Furthermore, as to the shape of the columnar spacer in the present invention, it is not particularly limited as long as it is a shape capable of constantly maintaining the gap between the two substrates. Specifically, the round columnar shape, the prism shape, the headed cone shape, or the like can be presented. Moreover, as the material for forming the columnar spacer, a photosensitive resin composition using a polymer, a copolymer or the like, made of at least one kind selected from the group consisting of an acrylic resin, a polyvinyl alcohol resin, a polyacrylic amide resin, an ethylene-vinyl acetate copolymer, an ethylene-vinyl chloride copolymer, an ethylene vinyl copolymer, a polystyrene, an acrylonitrile-styrene copolymer, an ABS resin, a polymethacrylic acid resin, an ethylene methacrylic acid resin, a polyvinyl chloride resin, a chlorinated vinyl chloride, a polyvinyl alcohol, a cellulose acetate propionate, a cellulose acetate butylate, a nylon 6, a nylon 66, a nylon 12, a polyethylene terephthalate, a polybutylene terephthalate, a polycarbonate, a polyvinyl acetal, a polyether ether ketone, a polyether sulfone, a polyphenylene sulfide, a polyallylate, a polyvinyl butylal, an epoxy resin, a phenoxy resin, a polyimide resin, a polyamide imide resin, a polyamic acid resin, a polyether imide resin, a phenol resin, a urea resin, or the like, and as a polymerizable monomer, a methyl acrylate, a methyl methacrylate, an ethyl acrylate, a ethyl methacrylate, an n-propyl acrylate, an n-propyl methacrylate, an isopropyl acrylate, an isopropyl methacrylate, a sec-butyl acrylate, a sec-butyl methacrylate, an isobutyl acrylate, an isobutyl methacrylate, a tert-butyl acrylate, a tert-butyl methacrylate, an n-pentyl acrylate, an n-pentyl methacrylate, an n-hexyl acrylate, an n-hexyl methacrylate, a 2-ethyl hexyl acrylate, a 2-ethyl hexyl methacrylate, an n-octyl acrylate, an n-octyl methacrylate, an n-decyl acrylate, an n-decyl methacrylate, a styrene, an α-methyl styrene, an N-vinyl-2-pyrrolidone, a glycidyl (meth)acrylate, and at least one kind selected from the group consisting of an acrylic acid, a methacrylic acid, a dimmer of an acrylic acid (such as M-5600 produced by TOAGOSEI), an itaconic acid, a crotonic acid, a maleic acid, a fumaric acid, a vinyl acetate, an acid anhydride thereof, or the like, can be presented. Among these examples, a photosensitive resin composition using an acrylic resin, an epoxy resin, or the like is preferable. This is owing to a small plastic deformation amount with the excellent function of constantly maintaining the gap between the two substrates.

(2) Black Matrix

The black matrix used in the present invention is provided for sectioning the pixels for executing the monochrome display according to the orientation of the liquid crystal molecules. The method for producing the black matrix is not particularly limited. For example, a method of forming a metal thin film of a chrome, or the like by a sputtering method, a vacuum deposition method, or the like by about a 1,000 Å to 2,000 Å thickness, and patterning the thin film, or the like can be presented.

The black matrix is formed narrower in the pixel part for improving the aperture ratio of the display area. In contrast, in the outer peripheral part, it is provided wider than the black matrix in the pixel part for effectively blocking the light beam from the light source, such as a back light. Specifically, the width of the black matrix provided in the pixel part is preferably in a range of 6 µm to 20 µm. In contrast, the width of the black matrix in the outer peripheral part is preferably in a range of 2 mm to 10 mm.

Moreover, as the above-mentioned black matrix, it is possible to contain in a resin binder, carbon fine particles, light blocking particles such as a metal oxide, an inorganic pigment, and an organic pigment. As the resin binder to be used, one kind or a mixture of two or more kinds of resins selected from the group consisting of a polyimide resin, an acrylic resin, an epoxy resin, a polyacrylic amide, a polyvinylalcohol, a gelatin, a casein, a cellulose, or the like, a photosensitive resin, an O/W emulsion type resin composition, such as an emulsion of a reactive silicone, or the like can be used. As to the method for patterning the resin black matrix, a commonly used method such as the photolithography method, and the printing method can be used.

(3) Protection Layer

The protection layer used in the present invention is provided for protecting the members in the substrate with the above-mentioned black matrix, or the like formed, and providing the flatness to the substrate surface of the substrate for a monochrome liquid crystal display apparatus.

As the material for forming the protection layer, a photosensitive resin composition including one or a plurality of a polymer, a copolymer or the like, made of at least one kind selected from the group consisting of an acrylic resin, an ethylene-vinyl acetate copolymer, an ethylene-vinyl chloride copolymer, an ethylene vinyl copolymer, a polystyrene, an acrylonitrile-styrene copolymer, an ABS resin, a polymethacrylic acid resin, an ethylene methacrylic acid resin, a polyvinyl chloride resin, a chlorinated vinyl chloride, a polyvinyl alcohol, a cellulose acetate propionate, a cellulose acetate butylate, a nylon 6, a nylon 66, a nylon 12, a polyethylene terephthalate, a polybutylene terephthalate, a polycarbonate, a polyvinyl acetal, a polyether ether ketone, a polyether sulfone, a polyphenylene sulfide, a polyallylate, a polyvinyl butylal, an epoxy resin, a phenoxy resin, a polyimide resin, a polyamide imide resin, a polyamic acid resin, a polyether imide resin, a phenol resin, a urea resin, or the like, and as a polymerizable monomer, a methyl acrylate, a methyl methacrylate, an ethyl acrylate, a ethyl methacrylate, an n-propyl acrylate, an n-propyl methacrylate, an isopropyl acrylate, an isopropyl methacrylate, a sec-butyl acrylate, a sec-butyl methacrylate, an isobutyl acrylate, an isobutyl methacrylate, a tert-butyl acrylate, a tert-butyl methacrylate, an n-pentyl acrylate, an n-pentyl methacrylate, an n-hexyl acrylate, an n-hexyl methacrylate, a 2-ethyl hexyl acrylate, a 2-ethyl hexyl methacrylate, an n-octyl acrylate, an n-octyl methacrylate, an n-decyl acrylate, an n-decyl methacrylate, a styrene, an $\alpha$-methyl styrene, an N-vinyl-2-pyrrolidone, a glycidyl (meth)acrylate, and at least one kind selected from the group consisting of an acrylic acid, a methacrylic acid, a dimmer of an acrylic acid (such as M-5600 produced by TOAGOSEI), an itaconic acid, a crotonic acid, a maleic acid, a fumaric acid, a vinyl acetate, an acid anhydride thereof, or the like, can be presented. Among these examples, in view of the flatness required for the protection layer, a photosensitive resin composition using an acrylic resin is preferable.

Moreover, as to the film thickness of the protection layer, it is not particularly limited as long as it is a film thickness capable of providing the flatness onto the substrate. Specifically, it is in a range of 0.3 μm to 10 μm, and in particular, it is preferably in a range of 0.7 μm to 2 μm.

As to the method for forming the protection layer, it can be formed by a known coating method. The coating methods such as the spin coating method, the casting method, the dipping method, a bar coating method, the blade coating method, the roll coating method, the gravure coating method, the flexo printing method, and the spray coating can be presented.

Although it is difficult to define on the whole the film thickness difference of the protection layer in each part generated by the width difference of the black matrix in the pixel part and the outer peripheral part since it differs depending on the width difference of the black matrix actually formed and the material for forming the protection layer, in general it is in a range of 0 μm and 0.5 μm in most cases.

(4) Substrate and Counter Substrate of the Substrate for a Monochrome Liquid Crystal Display Apparatus The substrate and the counter substrate of the substrate for a monochrome liquid crystal display apparatus in the present invention are for packaging the other constituent members. As the substrates, for example, a glass substrate, a glass film, a synthetic resin substrate, a synthetic resin film, or the like can be used, and those having the excellent light transmitting property are preferable.

(5) Monochrome Liquid Crystal Display Apparatus

The monochrome liquid crystal display apparatus for using the substrate for a monochrome liquid crystal display apparatus of the present invention is not particularly limited as long as it is a known liquid crystal display apparatus. Specifically, the IPS (in-plane switching) type, the STN (super twisted nematic) type, the ferroelectric type, the antiferroelectric type, or the like can be presented. In the present invention, in particular, the IPS type monochrome liquid crystal display apparatus is preferable. Since the IPS type particularly requires the highly precise adjustment in the gap between the two substrates, the effect of the substrate for a monochrome liquid crystal display apparatus can be utilized sufficiently.

As to the application of the monochrome liquid crystal display apparatus, a liquid crystal display apparatus with the monochrome display preferably selected can be considered. For example, the medical image photography such as the X-ray, or the like can be presented.

(6) Production Method for the Substrate for a Monochrome Liquid Crystal Display Apparatus Next, the production method for the substrate for a monochrome liquid crystal display apparatus of the present invention will be explained.

The production method for the substrate for a monochrome liquid crystal display apparatus of the present invention comprises forming a black matrix in a pattern on a substrate, forming a protection layer on the substrate having the black matrix formed in the pattern so as to cover the black matrix, and forming a columnar spacer for adjusting the gap between the substrate and the counter substrate in the area with the black matrix formed of the protection layer individually and separately as the pixel spacer provided in the pixel part of the substrate, and as the outer peripheral spacer provided in the outer peripheral part disposed in the periphery of the pixel part of the substrate.

Since the columnar spacers can be formed to a height required thereto by each individually forming the pixel spacer and the outer periphery spacer, the height difference in the pixel part and in the outer peripheral part of the substrate for a monochrome liquid crystal display apparatus can be controlled easily in a desired range.

An example of the production method for the substrate for a monochrome liquid crystal display apparatus of the present invention will be explained. The black matrix for sectioning between the pixels is formed in a pattern on the substrate of the substrate for a monochrome liquid crystal display apparatus. At the time, as mentioned above, since the required widths differ in the pixel part and in the outer peripheral part, the width of the black matrix in the pixel part is made narrower than that of the outer peripheral part. Furthermore, the protection layer is formed on the substrate of the substrate for a monochrome liquid crystal display apparatus with the black matrix formed for protecting the members such as the black matrix and providing the flatness onto the substrate. At the time, since the black matrix widths differ in the pixel part and in the outer peripheral part as mentioned above, the film thickness of the protection layer differs in the both parts.

Next, the columnar spacer is formed on the protection layer. In the present invention, the columnar spacer is formed individually and separately as the above-mentioned pixel spacer and outer peripheral spacer. Thereby, since the columnar spacers can be formed each to the required height according to the above-mentioned film thickness difference of the protection layer, a preferable height evenness can be ensured to the surface of the substrate for a monochrome liquid crystal display apparatus to be finally obtained.

Finally, the counter substrate is disposed, facing the substrate for a monochrome liquid crystal display apparatus via the pixel spacer and the outer peripheral spacer. Since the influence by the film thickness difference of the protection layer is solved by each individually forming the pixel spacer and the outer peripheral spacer, there is no risk of generating the distortion in the counter substrate of widening the gap between the two substrates toward the outer peripheral part. Therefore, the trouble of leaking the light beam form the light source such as a back light from the periphery of the counter substrate due to the distortion of the counter substrate so as to have the peripheral part of the display screen brighter can be solved. Therefore, by using the substrate for a monochrome liquid crystal display apparatus produced by the production method of the present invention, a monochrome liquid crystal display apparatus capable of providing the rich gradation display and the precise image display can be provided.

B. Production Method for the Substrate for a Monochrome Liquid Crystal Display Apparatus.

Next, the production method for the substrate for a monochrome liquid crystal display apparatus of the present invention will be explained specifically with reference to the drawings.

Figure 2A:
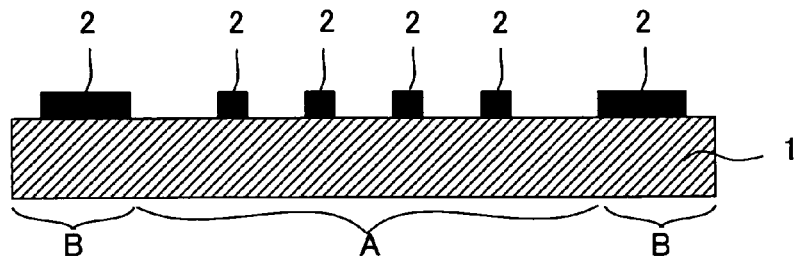
FIGS. 2A to 2E are process diagrams showing an example of a production method for a substrate for a monochrome liquid crystal display apparatus according to the present invention.

FIGS. 2A to 2E are process diagrams showing an example of a production method for a substrate for a monochrome liquid crystal display apparatus according to the present invention. First, as shown in FIG. 2A, the black matrix 2 for sectioning between the pixels is formed in a pattern on the substrate 1 of the substrate for a monochrome liquid crystal display apparatus. At the time, the black matrix 2 is formed such that the line width differs in the pixel part A as the display area of the monochrome liquid crystal display apparatus and in the outer peripheral part B outside the display area. Specifically, the line width is formed narrower in the pixel part A for preventing deterioration of the aperture ratio of the display area. In contrast, the line width is formed wider in the outer peripheral part B for blocking the light beam from the light source.

Figure 2B:
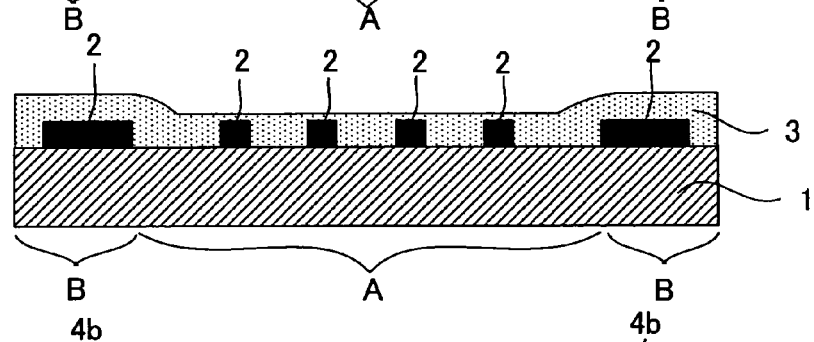

Next, as shown in FIG. 2B, the protection layer 3 is formed on the substrate 1 of the substrate for a monochrome liquid crystal display apparatus with the black matrix 2 formed for protecting the members such as the black matrix 2, and providing the flatness to the surface of the substrate 1 so as to cover the black matrix 2 surface. According to the protection layer 3, the film thickness differs with the line width difference of the black matrix in the pixel part A and in the outer peripheral part B as the factor. That is, since the line width of the black matrix 2 is narrower in the pixel part A, the film thickness of the protection layer 3 to be laminated on the upper surface of the black matrix 2 tends to be thinner. In contrast, since the black matrix 2 is formed in the outer peripheral part B with the line width sufficient for laminating the protection layer provided, the film thickness of the protection layer 3 to be laminated onto the upper surface thereof is made thicker than that of the protection layer 3 in the pixel part A.

Figure 2C:
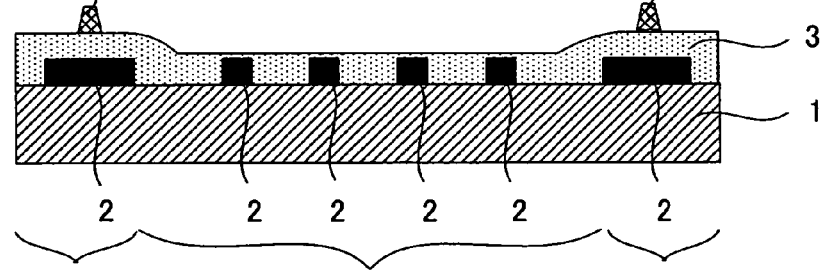
Figure 2D:
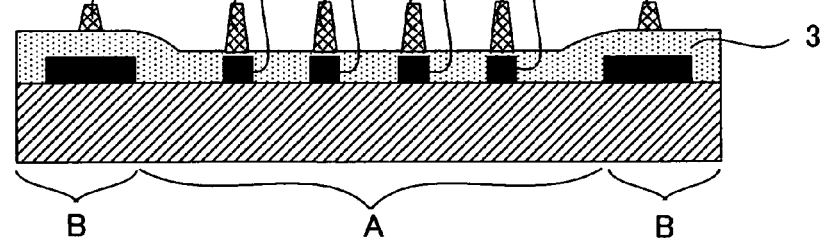

As shown in FIG. 2C, the outer peripheral spacer 4b is formed in the outer peripheral part B on the area with the black matrix 2 formed of the protection layer 3. Next, as shown in FIG. 2D, the pixel spacer 4a is formed on the area with the black matrix 2 formed of the protection layer 3 in the pixel part A. Since the first outer peripheral spacer 4b is formed and then the pixel spacer 4a is formed accordingly, at the time of forming the outer peripheral spacer 4b, wetting and spreading of the coating liquid for forming the outer peripheral spacer 4b cannot be disturbed by the pixel spacer 4a so that the coating liquid can be applied with the even film thickness. Moreover, since the outer peripheral spacer 4b is already formed at the time of forming the pixel spacer 4a, the influence at the time of forming the outer peripheral spacer 4b is not posed to the pixel spacer 4a so that the further precise adjustment of the height, or the like can be enabled. Moreover, since the outer peripheral spacer 4b and the pixel spacer 4a are formed individually, the heights of the columnar spacers 4a, 4b can be adjusted individually according to the film thickness difference in the pixel part A and in the outer peripheral part B of the protection layer 3 laminated on the black matrix 2. That is, since the film thickness of the protection layer 3 laminated on the black matrix 2 is thinner in the pixel part A, by having the height of the pixel spacer 4a itself higher than the height of the outer peripheral spacer 4b itself, the above-mentioned influence by the protection layer 3 film thickness difference can be avoided in the substrate for a monochrome liquid crystal display apparatus to be finally obtained. Thereby, the substrate for a monochrome liquid crystal display apparatus of the present invention can be produced.

Figure 2E:
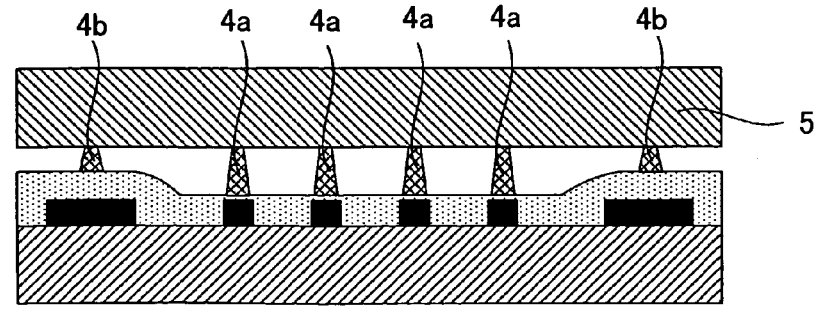
Figure 3:
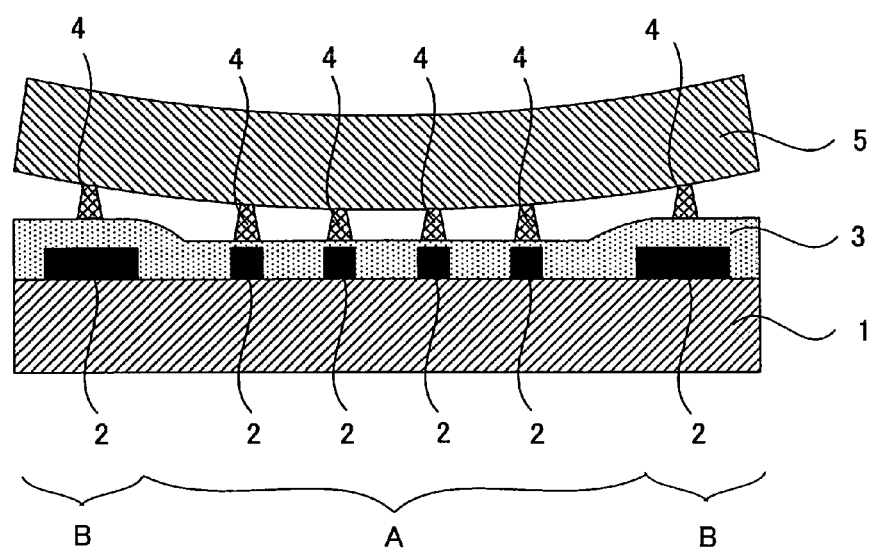
FIG. 3 is a schematic cross-sectional view showing an example of a substrate for a conventional monochrome liquid crystal display apparatus.

Then, as shown in FIG. 2E, the counter substrate 5 is disposed on the substrate for a monochrome liquid crystal display apparatus via the columnar spacers 4a, 4b. In the present invention, since the columnar spacers 4a, 4b are formed so as to maintain the preferable evenness of the upper end face, the troublesome distortion is not generated in the counter substrate 5 disposed via the columnar spacers 4a, 4b. Thereby, since the leakage of the light beam from the light source from the periphery of the counter substrate 5, or the like can be prevented, the problem of the unnatural brightness in the periphery of the display screen can be solved.

The "pixel part" and the "outer peripheral part" here are same as those explained in the above-mentioned "A. Substrate for a monochrome liquid crystal display apparatus".

Moreover, the "pixel spacer" here denotes the columnar spacer disposed in the above-mentioned pixel part, and the "outer peripheral spacer" denotes the columnar spacer formed in the outer peripheral part disposed in the periphery of the above-mentioned pixel part. Hereinafter, the columnar spacer disposed in the pixel part may be referred to as the pixel spacer, and the columnar spacer disposed in the outer peripheral part as the outer peripheral spacer.

The production method for a substrate for a monochrome liquid crystal display apparatus of the present invention having the advantages will be explained in detail for each process hereinafter.

1. Black Matrix Forming Process

The black matrix forming process in the present invention is a process for forming the black matrix on the substrate of the substrate for a monochrome liquid crystal display apparatus in a pattern. At the time, as mentioned above, the line width is made different in the pixel part and in the outer peripheral part. Specifically, as shown in FIG. 2A, the line width is made narrower in the pixel part A for preventing deterioration of the aperture ratio of the display area. In contrast, the line width is made wider in the outer peripheral part B for blocking the light beam from the light source.

The members comprising the process will be explained.

(1) Black Matrix

The black matrix used in the present invention is provided for sectioning the pixels for executing the monochrome display according to the orientation of the liquid crystal molecules. The method, the material, or the like for producing the black matrix are not particularly limited, and the same explained in the item of the black matrix of the above-mentioned "A. Substrate for a monochrome liquid crystal display apparatus" can be used, and thus detailed explanation is omitted here.

(2) Substrate of the Substrate for a Monochrome Liquid Crystal Display Apparatus The substrate of the substrate for a monochrome liquid crystal display apparatus in the present invention is for packaging the other constituent members. As the substrates, for example, a glass substrate, a glass film, a synthetic resin substrate, a synthetic resin film, or the like can be used, and those having the excellent light transmitting property are preferable.

2. Protection Layer Forming Process

The protection layer forming process in the present invention is a process for forming the protection layer on the substrate of the substrate for a monochrome liquid crystal display apparatus having the black matrix formed in a pattern in the former process so as to cover the black matrix. In this process, for example, as shown in FIG. 2B, the film thickness of the protection layer 3 laminated on the black matrix 2 is made thicker in the outer peripheral part B than in the pixel part A due to the line width difference of the black matrix 2 in the pixel part A and in the outer peripheral part B. Hereinafter, the protection layer to be formed in this process will be explained.

(Protection Layer)

The protection layer in the present invention is provided for protecting the members in the substrate with the above-mentioned black matrix, or the like formed, and for providing the flatness to the substrate surface of the substrate for a monochrome liquid crystal display apparatus.

Since the material, the forming method, or the like for forming the protection layer are same as those explained in the item of the protection layer in the above-mentioned "A. Substrate for a monochrome liquid crystal display apparatus", and thus detailed explanation is omitted here.

3. Columnar Spacer Forming Process

Next, the columnar spacer forming process will be explained. The columnar spacer forming process in the present invention is a process for forming the columnar spacer for adjusting the gap between the substrate for a monochrome liquid crystal display apparatus and the counter substrate in the area of the protection layer with the black matrix formed first in the outer peripheral part disposed in the periphery of the pixel part as the display area of the monochrome liquid crystal display apparatus, and then in the above-mentioned pixel part. Specifically, as shown in FIG. 2C, the outer peripheral spacer 4b is formed in the outer peripheral part B in the area with the black matrix 2 formed of the protection layer. Next, as shown in FIG. 2D, the pixel spacer 4a is formed in the pixel part A in the area with the black matrix 2 formed of the protection layer 3.

Since the columnar spacer is formed first in the outer peripheral part, and then in the pixel part separately, the columnar spacers can be formed precisely. This is because of the following reasons.

For example, in the case the pixel spacer as the columnar spacer disposed in the pixel part is formed first, at the time of forming the outer peripheral spacer as the columnar spacer disposed in the outer peripheral part, since the pixel spacer is formed already in the pixel part occupying a wider range than the outer peripheral part, if the coating liquid for forming the outer peripheral spacer is coated onto the substrate, the risk of generating the film thickness difference without wetting and spreading to the even film thickness is high with the pixel spacer as the disturbing factor. Thereby, the film thickness irregularity is generated in each outer peripheral spacer. Moreover, depending on the coating method of the coating liquid, the stripe-like film thickness irregularity can be generated radially. For example, if the pixel spacer is formed first using the coating method, the stripe-like film thickness irregularity can be generated in the outer peripheral part so as to pose the influence at the time of forming the outer peripheral spacer. Furthermore, in the case the pixel spacer is formed first, the pixel spacer needs to have the baking process twice, that is, the process of forming the pixel spacer itself and the process for forming the outer peripheral spacer. Therefore, at the time of forming the pixel spacer, the influence at the time of forming the outer peripheral spacer thereafter should be taken into consideration. Particularly in the pixel part requiring the highly precise height adjustment, it is difficult to sufficiently satisfy the demand.

From these viewpoints, the columnar spacers can be formed precisely by forming the columnar spacer form the outer peripheral part. Hereinafter, the columnar spacer in the present invention will be explained in detail.

(Columnar Spacer)

The columnar spacer in the present invention is disposed between the two substrates for clamping the liquid crystal layer in the inside for constantly maintaining the gap between the substrates. According to the present invention, by forming the columnar spacer in the pixel part after forming first in the outer peripheral part, the two kinds of the columnar spacers having the different heights can be formed precisely in the pixel part and in the outer peripheral part.

The method for forming the columnar spacer is not particularly limited as long as it is a method capable of forming in a pattern precisely in the pixel part and in the outer peripheral part on the protection layer area with the black matrix formed. Specifically, the photolithography method, or the like can be presented. For example, in the case the columnar spacer is formed with a photosensitive resin, the columnar spacer can be patterned by exposing with the ultraviolet ray via the mask formed in a predetermined pattern, developing, and further hardening. By repeating the process twice, the outer peripheral spacer can be formed first, and then the pixel spacer can be formed.

Moreover, at the time of forming the columnar spacer by the above-mentioned forming method, as the method for applying the coating liquid for forming the columnar spacer, the known coating methods can be presented. Specifically, examples include the spin coating method, the casting method, the dipping method, a bar coating method, the blade coating method, the roll coating method, the gravure coating method, the flexo printing method, and the spray coating. For example, in the case of coating by the spin coating method as the coating method, since the coating liquid is applied and spread from the central part to the peripheral part, the stripe-like film thickness irregularity may be generated radially. In this case, if the columnar spacer is formed from the pixel part, the influence of the film thickness irregularity can be posed at the time of forming the outer peripheral spacer so as to provide the factor for generating the film thickness irregularity in the outer peripheral spacer. However, according to the present invention, since the columnar spacer is formed first from the outer peripheral part, the columnar spacers can be formed precisely without such concern.

As mentioned above, according to this process, since the columnar spacer is formed first from the outer peripheral part, the outer peripheral spacer have the baking process twice, that is, at the time of hardening the outer peripheral spacer itself and at the time of hardening the pixel spacer. Therefore, at the time of forming the outer peripheral spacer, it is preferable to adjust the coating amount in consideration of the influence by the two times baking processes. For example, the contraction ratio of the columnar spacer by baking, or the like can be presented. Specifically, as the contraction ratio of the columnar spacer, although it is difficult to define on the whole since it differs depending on the material to be used, with the material used for the common columnar spacer provided as the reference, the contraction ratio of the columnar spacer is in most cases in a range of 90% to 98%. By adjusting the film thickness of the outer peripheral spacer in consideration of the contraction ratio, or the like, the columnar spacer can be formed further precisely in the outer peripheral part.

In contrast, since the pixel spacer is formed after the outer peripheral spacer, it does not have the two times baking process, or the like unlike the outer peripheral spacer. Therefore, by forming the pixel spacer requiring the highly precise height adjustment after the outer peripheral spacer, the influence at the time of forming the outer peripheral spacer cannot be posed to the pixel spacer so that the height adjustment of the pixel spacer can be facilitated.

Moreover, the relationship of the heights of the pixel spacer and the outer peripheral spacer is not particularly limited as long as the height of the pixel spacer is higher than the height of the outer peripheral spacer to the degree that the above-mentioned distortion is not generated between the two substrates at the time of disposing the same. The film thickness of the protection layer laminated on the black matrix is formed thinner in the pixel part than in the outer peripheral part due to the line width difference of the black matrix in the pixel part and in the outer peripheral part, and the protection layer film thickness difference can be corrected by the columnar spacers by having the height of the pixel spacer higher than the height of the outer peripheral spacer.

Specifically, the height difference of the pixel spacer and the outer peripheral spacer is adjusted according to the film thickness difference in the pixel part and in the outer peripheral part of the protection layer laminated on the black matrix. For example, by measuring, simulating, or the like the film thickness difference of the protection layer at the stage the protection layer is formed for preliminarily grasping the state of the substrate for a monochrome liquid crystal display apparatus, the height difference of the pixel spacer and the outer peripheral spacer is adjusted according to the state. Therefore, although it is difficult to define the height difference of the pixel spacer and the outer peripheral spacer on the whole, based on the film thickness difference of the protection layer to be generally generated, it is preferable that the height of the pixel spacer is made higher than the height of the outer peripheral spacer itself by in a range of 0.5 µm to 1.3 µm, and in particular, in a range of 0.7 µm to 1.1 µm.

Moreover, it is preferable that the height from the substrate surface of the substrate for a monochrome liquid crystal display apparatus to the pixel spacer upper surface is higher than the height from the same substrate surface to the outer peripheral spacer upper surface by in a range of 0 µm to 0.8 µm, in particular, in a range of 0.2 µm to 0.6 µm. By forming the height of the pixel spacer higher than that of the outer peripheral spacer in the above-mentioned range so as to have the height difference in the pixel part and in the outer peripheral part of the surface of the substrate for a monochrome liquid crystal display apparatus, the two substrates can be disposed with a sufficient even gap maintained without generating the troublesome distortion in the counter substrate.

Moreover, the height of the pixel spacer itself is not particularly limited as long as it is a height used in a common monochrome liquid crystal display apparatus. Specifically, it is preferably in a range of 2.5 µm to 5.5 µm.

Here, as to the shape of the columnar spacer in the present invention, it is not particularly limited as long as it is a shape capable of constantly maintaining the gap between the two substrates. Since the shape and the material for forming the columnar spacer are same as those explained in the item of the columnar spacer in the above-mentioned "A. Substrate for a monochrome liquid crystal display apparatus", thus detailed explanation is omitted here.

4. Others

According to the above-mentioned processes, the substrate for a monochrome liquid crystal display apparatus of the present invention can be produced. Thereafter, by disposing the counter substrate on the substrate for a monochrome liquid crystal display apparatus via the columnar spacer, a monochrome liquid crystal display apparatus can be obtained.

The monochrome liquid crystal display apparatus for using the substrate for a monochrome liquid crystal display apparatus produced by the present invention is not particularly limited as long as it is a known liquid crystal display apparatus. Specifically, the IPS (in-plane switching) type, the STN (super twisted nematic) type, the ferroelectric type, the antiferroelectric type, or the like can be presented. In the present invention, in particular, the IPS type monochrome liquid crystal display apparatus is preferable. Since the IPS type particularly requires the highly precise adjustment in the gap between the two substrates, the effect of the substrate for a monochrome liquid crystal display apparatus can be utilized sufficiently.

As to the application of the monochrome liquid crystal display apparatus, a liquid crystal display apparatus with the monochrome display preferably selected can be considered. For example, the medical image photography such as the X-ray, or the like can be presented.

The present invention is not limited to the above-mentioned embodiments. The above-mentioned embodiments are examples, and any one having the technical concept disclosed in the claims of the present invention and the substantially same configuration, capable of achieving the same effects can be included in the technological scope of the present invention.

EXAMPLES

Hereinafter, the present invention will further be explained with reference to the examples.

Example 1

A 300 mm×400 mm size, and 0.7 mm thickness glass substrate (1737 glass produced by Corning, Inc.) was prepared as the substrate for a color filter. After washing the substrate by an ordinary method, a black matrix composition of the below-mentioned composition was coated on one side of the substrate. After exposing via a predetermined mask, it was developed and baked so as to form a black matrix (film thickness 1.3 µm).

| (Black matrix composition) | |
|---|---|
| Titanium black (13M produced by Mitsubishi Materials Corporation) | 61 parts by weight |
| Photosensitive resin composition | 39 parts by weight |
| Methoxy butyl acetate | 300 parts by weight |
| (Photosensitive resin composition) | |

-continued

| (Black matrix composition) | |
| --- | --- |
| Methacrylic acid-styrene-acrylic acid radical copolymer | 42 parts by weight |
| Dipentaerythritol hexa acrylate | 32 parts by weight |
| EPIKOTE 180S70 (produced by Yuka-Shell Epoxy Co. Ltd.) | 18 parts by weight |
| 2-benzyl-2-dimethyl amino-1-(4-morphorino phenyl)-butanone-1 (produced by Chiba Speciality Chemicals) | 8 parts by weight |

Next, a 1.5 µm thickness protection layer was formed by coating the protection layer photosensitive material of the below-mentioned composition on the entire surface of the substrate with the black matrix formed, exposing via the mask, developing and baking.

| (Protection layer photosensitive composition) | |
| --- | --- |
| Styrene-methyl methacrylate-methacrylic acid copolymer | 59 parts by weight |
| Dipentaerythritol pentaacrylate | 30 parts by weight |
| IRGACURE 907 (produced by Chiba Specialty Chemicals Corp.) | 11 parts by weight |
| Propylene glycol monomethyl ether acetate | 333 parts by weight |

Next, the photosensitive material for the columnar spacer (NN series produced by JSR) was applied in the condition to be lower than the upper surface of the columnar spacer to be formed in the pixel by 0 to 0.8 µm. After exposing via the mask for the columnar spacer to be provided in the outer peripheral part, developing and baking were executed. Subsequently, the photosensitive material of the columnar spacer to be formed in the pixel part (same as above) is applied onto the substrate entire surface. After exposing via the columnar spacer to be provided in the pixel, developing and baking were executed.

Example 2

A 300 mm×400 mm size, and 0.7 mm thickness glass substrate (1737 glass produced by Corning, Inc.) was prepared as the substrate for a color filter. After washing the substrate by an ordinary method, a black matrix composition of the above-mentioned composition was coated on one side of the substrate. After exposing via a predetermined mask, it was developed and baked so as to form a black matrix.

Next, the protection layer composition was applied so as to cover the black matrix. After exposing via a predetermined mask, developing and baking were executed for forming the protection layer.

Next, the photosensitive material for the columnar spacer was applied to the surface with the black matrix and the protection layer formed. After exposing via the mask formed so as to form only the outer peripheral spacer, developing and baking were executed for forming the outer peripheral spacer on the protection layer with the black matrix formed disposed in the outer peripheral part.

Subsequently, the columnar spacer photosensitive material was applied onto the surface with the black matrix, the protection layer and the outer peripheral spacer formed. After exposing via a mask formed so as to form only the pixel spacer, developing and baking were executed so as to form the pixel spacer onto the protection layer with the black matrix formed disposed in the pixel part.

The height from the substrate surface to the pixel spacer upper surface was higher than the height to the outer peripheral spacer by 0.7 µm.

According to the counter substrate to be disposed on the substrate formed thereby, there was no risk of distortion so as to have the gap between the two substrates widened toward the outer peripheral part so that the trouble of light beam leakage from the periphery of the counter substrate can hardly be generated. Thereby, the trouble of the brightness in the peripheral part of the display screen can be solved.

COMPARATIVE EXAMPLE

A 300 mm×400 mm size, and 0.7 mm thickness glass substrate (1737 glass produced by Corning, Inc.) was prepared as the substrate for a color filter. After washing the substrate by an ordinary method, a black matrix composition of the above-mentioned composition was coated on one side of the substrate. After exposing via a predetermined mask, it was developed and baked so as to form a black matrix.

Next, the protection layer composition was applied so as to cover the black matrix. After exposing via a predetermined mask, developing and baking were executed for forming the protection layer.

Next, the photosensitive material for the columnar spacer was applied to the surface with the black matrix and the protection layer formed. After exposing via the mask formed so as to form only the pixel spacer, developing and baking were executed for forming the pixel spacer on the protection layer with the black matrix formed disposed in the pixel part.

Subsequently, the columnar spacer photosensitive material was applied onto the surface with the black matrix, the protection layer and the pixel spacer formed. The radial irregularity was generated due to the pixel spacer in the pixel part being the disturbing factor. After exposing the coating film via a mask formed so as to form only the outer peripheral spacer, developing and baking were executed so as to form the outer peripheral spacer onto the protection layer with the black matrix formed disposed in the outer peripheral part.

The outer peripheral spacer had a height irregularity. Moreover, also as to the pixel spacer, since it had the two times baking steps, the height evenness was lowered.

The height from the substrate surface to the pixel spacer upper surface was higher than the height to the outer peripheral spacer by 0.7 µm.

According to the counter substrate to be disposed on the substrate formed thereby, although there was no risk of distortion so as to have the gap between the two substrates widened toward the outer peripheral part, the gap failure in the pixel part was observed.

What is claimed is:

1. A substrate for a monochrome liquid crystal display apparatus comprising:

a substrate, a black matrix formed in a pattern on the substrate, a protection layer formed on the substrate so as to cover the black matrix, and a columnar spacer formed in the area with the black matrix formed on the protection layer, for adjusting the gap between the substrate and the counter substrate, wherein the height from the surface of the substrate to the upper surface of the columnar spacer provided in the pixel part of the substrate is higher than the height from the substrate surface to the upper surface of the columnar spacer provided in the outer peripheral part as the pixel part peripheral area of the substrate by in a range of 0 μm to 0.8 μm, and no colored layer is formed between the black matrix in the pixel part, said columnar spacer comprising a pixel spacer provided in the pixel part of the substrate, and an outer peripheral spacer is provided in the outer peripheral part of the substrate such that the height of the pixel spacer is made higher than the height of the outer peripheral spacer.

2. The substrate for a monochrome liquid crystal display apparatus according to claim 1, wherein the substrate for a monochrome liquid crystal display apparatus is used for an IPS monochrome liquid crystal display apparatus.

3. A substrate for a monochrome liquid crystal display apparatus comprising:

a substrate, a black matrix formed in a pattern on the substrate, a protection layer formed on the substrate so as to cover the black matrix, and a columnar spacer formed in the area with the black matrix formed on the protection layer, for adjusting the gap between the substrate and the counter substrate, wherein the columnar spacer comprises a pixel spacer provided in the pixel part of the substrate, and an outer peripheral spacer provided in the outer peripheral part as the pixel part peripheral area of the substrate such that the height of the pixel spacer is made higher than the height of the outer peripheral spacer.

4. The substrate for a monochrome liquid crystal display apparatus according to claim 3, wherein the substrate for a monochrome liquid crystal display apparatus is used for an IPS monochrome liquid crystal display apparatus.

5. A production method for a substrate for a monochrome liquid crystal display apparatus comprising:

forming a black matrix in a pattern on a substrate, forming a protection layer on the substrate having the black matrix formed in the pattern so as to cover the black matrix, and forming a columnar spacer for adjusting the gap between the substrate and the counter substrate in the area with the black matrix formed on the protection layer first in the outer peripheral part in the periphery of the pixel part as the display area of the monochrome liquid crystal display apparatus, and then forming the same in the pixel part.

6. The production method for a substrate for a monochrome liquid crystal display apparatus according to claim 5, wherein the substrate for a monochrome liquid crystal display apparatus is used for an IPS monochrome liquid crystal display apparatus.

* * * * *